United States Patent
Marchlewski et al.

(10) Patent No.: US 10,752,294 B2
(45) Date of Patent: Aug. 25, 2020

(54) VEHICLE WITH REMOVABLE OUTER BODY PANEL AND DETACHABLE TAIL LAMP SUPPORT, AND CORRESPONDING METHOD

(71) Applicant: Ford Global Technologies, LLC, Dearborn, MI (US)

(72) Inventors: Jack Marchlewski, Saline, MI (US); Darrin Wagner, Bloomfield Hills, MI (US); Robert Reiners, Grosse Ile, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 59 days.

(21) Appl. No.: 16/202,917

(22) Filed: Nov. 28, 2018

(65) Prior Publication Data
US 2020/0164923 A1    May 28, 2020

(51) Int. Cl.
*B62D 25/02* (2006.01)
*B62D 25/08* (2006.01)
(Continued)

(52) U.S. Cl.
CPC ............. *B62D 24/00* (2013.01); *B62D 25/02* (2013.01); *B62D 25/08* (2013.01); *B62D 65/16* (2013.01); *B60Q 1/30* (2013.01)

(58) Field of Classification Search
CPC ........ B62D 25/02; B62D 25/08; B62D 24/00; B62D 27/06; B62D 27/065; B62D 65/16;
(Continued)

(56) References Cited

U.S. PATENT DOCUMENTS

D173,033 S     9/1954  King
4,652,044 A *  3/1987  Harasaki ................ B62D 25/08
                                                        296/198
(Continued)

FOREIGN PATENT DOCUMENTS

CN      107487373 A       12/2017
FR         2827254    *    1/2003 ............. B60R 19/18
(Continued)

OTHER PUBLICATIONS

Extreme Terrain, "Barricade Classic Rear Bumper with tier Carrier [87-06 Jeep Wrangler YJ & TJ," Downloaded from: https://www.extremeterrain.com/barricade-rear-bumper-j20852.html, Oct. 2018.
(Continued)

*Primary Examiner* — Gregory A Blankenship
(74) *Attorney, Agent, or Firm* — David Coppiellie; Carlson, Gaskey & Olds, P.C.

(57) ABSTRACT

This disclosure relates to a motor vehicle with a removable outer body panel and a detachable tail lamp support, and a corresponding method. An example method includes connecting a subassembly to a body of a motor vehicle, where the subassembly includes an outer body panel connected to a tail lamp support. This arrangement permits detachment of the tail lamp support from the outer body panel, which allows a user to detach the outer body panel from the body without having to detach the tail lamp support.

17 Claims, 4 Drawing Sheets

(51) Int. Cl.
  *B62D 24/00* (2006.01)
  *B62D 65/16* (2006.01)
  *B60Q 1/30* (2006.01)

(58) Field of Classification Search
  CPC ... B60Q 1/30; B60Q 1/32; B60Q 1/34; B60Q 1/44
  USPC .................................................... 296/193.08
  See application file for complete search history.

(56) References Cited

U.S. PATENT DOCUMENTS

| | | | |
|---|---|---|---|
| 5,876,086 A | 3/1999 | Lagrou et al. | |
| 6,003,933 A * | 12/1999 | Rinklin | B60R 19/24 296/198 |
| 8,967,702 B2 | 3/2015 | Mochizuki et al. | |
| 2001/0020796 A1 * | 9/2001 | Delavalle | B62D 25/08 296/193.04 |
| 2002/0135203 A1 * | 9/2002 | Pommeret | B60Q 1/30 296/146.15 |
| 2004/0007898 A1 * | 1/2004 | Pommeret | B60R 19/50 296/187.01 |
| 2004/0066061 A1 * | 4/2004 | Engels | B60R 19/18 296/193.08 |
| 2018/0105098 A1 * | 4/2018 | Koch | B60Q 1/2653 |
| 2018/0118280 A1 | 5/2018 | Marchlewski et al. | |

FOREIGN PATENT DOCUMENTS

| | | |
|---|---|---|
| JP | 2010285019 A | 12/2010 |
| JP | 2015056667 A1 | 3/2017 |
| KR | 1020010066475 A | 7/2001 |

OTHER PUBLICATIONS

Raybuck, "1987-1996 Ford Bronco Complete Quarter Panel, Driver Side," downloaded from: https://raybuck.com/product/1987-96-bronco-complete-quarter-panel-driver-side/, Oct. 2018. Copyrighted 2018.

* cited by examiner

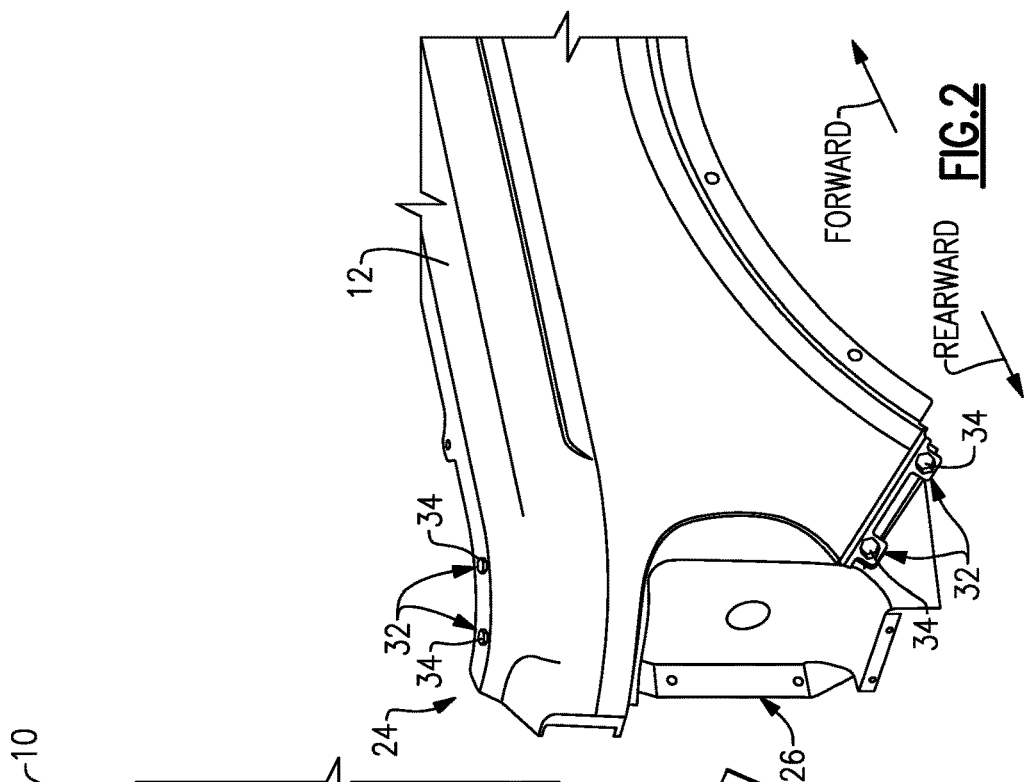
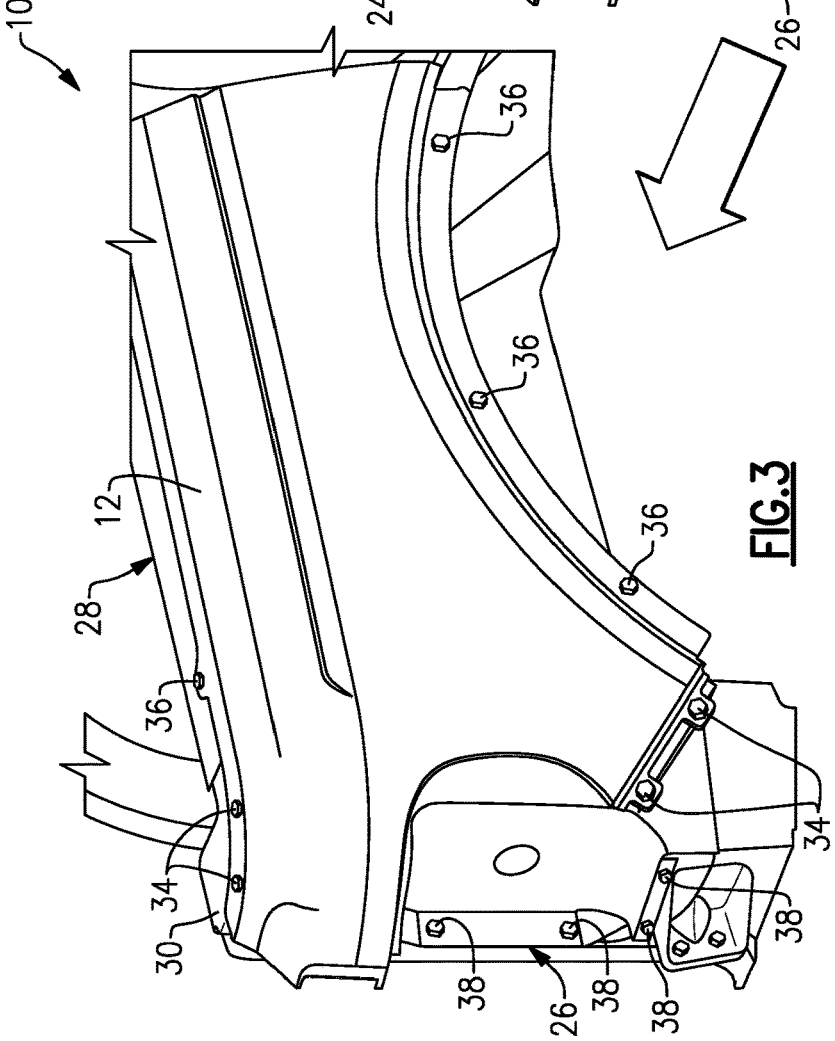

VEHICLE WITH REMOVABLE OUTER BODY PANEL AND DETACHABLE TAIL LAMP SUPPORT, AND CORRESPONDING METHOD

TECHNICAL FIELD

This disclosure relates to a motor vehicle with a removable outer body panel and a detachable tail lamp support, and a corresponding method.

BACKGROUND

Vehicles include outer panels. Users may periodically remove and replace the outer panels for aesthetic reasons or due to damage, as examples. More particularly, users may choose to replace the outer panels to provide their vehicle with a more rugged appearance, for example, or to equip their vehicle with outer panels that are better suited to off-roading.

SUMMARY

A method according to an exemplary aspect of the present disclosure includes, among other things, connecting a subassembly to a body of a motor vehicle. The subassembly includes an outer body panel connected to a tail lamp support.

In a further non-limiting embodiment of the foregoing method, a constant relative position between the outer body panel and the tail lamp support is maintained during the step of connecting the subassembly to the body.

In a further non-limiting embodiment of any of the foregoing methods, the tail lamp support is aligned relative to the outer body panel before being connected to the outer body panel.

In a further non-limiting embodiment of any of the foregoing methods, the step of connecting the subassembly to the body includes connecting the tail lamp support to the body such that the outer body panel may be removed from the body without requiring removal of the tail lamp support from the body.

In a further non-limiting embodiment of any of the foregoing methods, the method includes removing the outer body panel from the body while the tail lamp support remains connected to the body.

In a further non-limiting embodiment of any of the foregoing methods, the tail lamp support is connected to a D-pillar of the motor vehicle.

In a further non-limiting embodiment of any of the foregoing methods, the method includes mounting a tail lamp to the tail lamp support.

In a further non-limiting embodiment of any of the foregoing methods, the method includes removing the outer body panel from the body while the tail lamp remains connected to the tail lamp support.

In a further non-limiting embodiment of any of the foregoing methods, the subassembly includes a first set of fasteners connecting the outer body panel to the tail lamp support, and the step of connecting the subassembly to the body includes connecting the outer body panel to the body with a second set of fasteners and connecting the tail lamp support to the body with a third set of fasteners.

In a further non-limiting embodiment of any of the foregoing methods, the step of removing the outer body panel from the body includes detaching the first and second sets of fasteners but not the third set of fasteners.

In a further non-limiting embodiment of any of the foregoing methods, the outer body panel is a rear quarter panel.

A motor vehicle according to an exemplary aspect of the present disclosure includes, among other things, a body and a subassembly connected to the body. The subassembly includes an outer body panel and a tail lamp support. Further, the tail lamp support is detachable from the outer body panel such that the outer body panel is removable from the body independent of the tail lamp support.

In a further non-limiting embodiment of the foregoing vehicle, the subassembly includes a first set of fasteners connecting the outer body panel to the tail lamp support, a second set of fasteners connect the outer body panel to the body, and a third set of fasteners connect the tail lamp support to the body.

In a further non-limiting embodiment of any of the foregoing vehicles, the outer body panel is removable from the body by detaching the first and second sets of fasteners and without requiring the detachment of the third set of fasteners.

In a further non-limiting embodiment of any of the foregoing vehicles, first set of fasteners are configured to maintain a constant relative position between the outer body panel and the tail lamp support as the subassembly is connected to the body.

In a further non-limiting embodiment of any of the foregoing vehicles, the vehicle includes a tail lamp mounted to the tail lamp support.

In a further non-limiting embodiment of any of the foregoing vehicles, the tail lamp is mounted to the tail lamp support such that the outer body panel may be removed from the body without requiring removal of the tail lamp from the tail lamp support.

In a further non-limiting embodiment of any of the foregoing vehicles, the outer body panel is a rear quarter panel.

BRIEF DESCRIPTION OF THE DRAWINGS

FIG. 2 is a perspective view of an example subassembly including an outer body panel and a tail lamp support connected to the outer body panel. In FIG. 2, the subassembly is not connected to the vehicle.

FIG. 3 is a view of a section of the vehicle, and illustrates the subassembly connected to the vehicle.

DETAILED DESCRIPTION

This disclosure relates to a motor vehicle with a removable outer body panel and a detachable tail lamp support, and a corresponding method. An example method includes connecting a subassembly to a body of a motor vehicle, where the subassembly includes an outer body panel connected to a tail lamp support. This arrangement permits detachment of the tail lamp support from the outer body panel, which allows a user to detach the outer body panel from the body without having to detach the tail lamp support. In this way, a user may replace the outer body panel, which may be a rear quarter panel, without having to remove and reattach the tail lamp support and, in turn, the tail lamp. Accordingly, this disclosure increases the ease of replacing and customizing the outer body panel while also reducing the likelihood that the tail lamp support (and the tail lamp) becomes removed and is unintentionally not reattached, which could pose a safety concern. These and other benefits will be appreciated from the below description.

Figure 1:
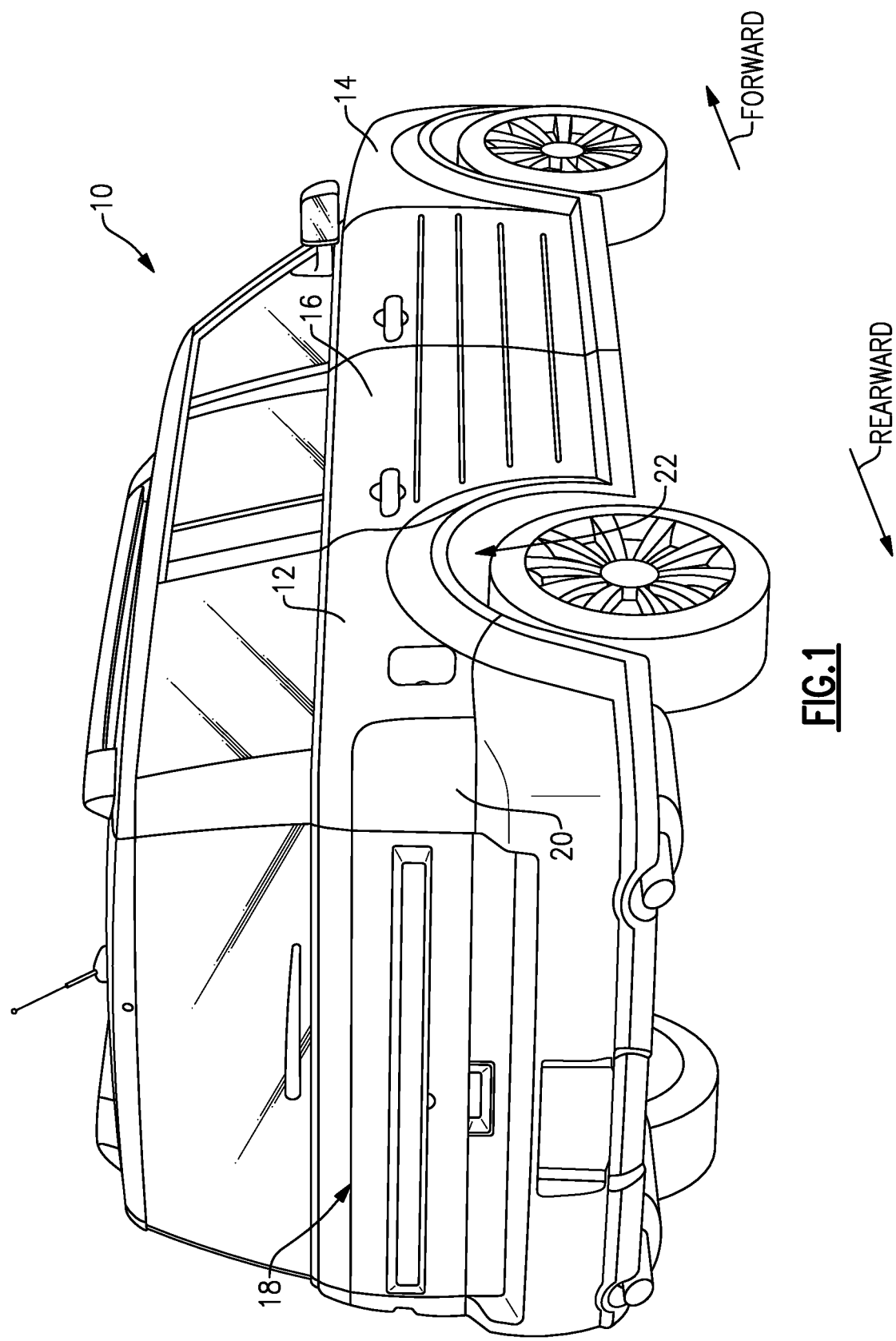
FIG. 1 is a rear perspective view of a motor vehicle.

Referring to the drawings, FIG. 1 is a rear-perspective view of a motor vehicle 10. As shown, the vehicle 10 is a sport utility vehicle (SUV). While an SUV is pictured, this disclosure is also applicable to other types of vehicles, such as vans and trucks (including pickup trucks).

The vehicle 10 includes a plurality of outer body panels 12, 14. The outer body panel 12 is a rear quarter panel of the vehicle 10, and is arranged between a rear door 16 and the rear liftgate 18 of the vehicle 10. The outer body panel 12 is also arranged adjacent a tail lamp 20 and a wheel well 22, and is contoured to correspond to the shapes of both the tail lamp 20 and the wheel well 22. The outer body panel 14 is a front fender of the vehicle 10. While these two particular outer body panels are shown, this disclosure extends to other types of outer body panels. Further, while only one of each type of outer body panel 12, 14 is shown in FIG. 1, it should be understood that the vehicle 10 includes two of each type of outer body panel, with one of each type of panel being arranged on generally opposite sides of the vehicle 10.

In this disclosure, at least the outer body panel 12 is configured to be selectively mounted and removed from a body of the vehicle 10. In particular, the outer body panel 12 is configured to be selectively mounted and removed from a frame of the vehicle 10. In this way, the outer body panel 12 may be referred to as "modular." The modularity of the outer body panel 12 permits a user to readily replace the outer body panel 12 for aesthetic reasons or if it becomes damaged. In particular, the modularity of the outer body panel 12 permits a user to replace a standard outer body panel with a more robust outer body panel, which may be an aftermarket part or purchased as an accessory through an original equipment manufacturer (OEM), thereby providing the vehicle 10 with a more rugged appearance, for example, or to equip their vehicle with outer panels that are better suited to off-roading.

In general, the manner in which the outer body panel 12 is mounted to the frame of the vehicle 10 is tightly controlled for precision so that the outer surface of the vehicle 10 appears flush. If not properly mounted, safety and quality concerns may arise. In one known assembly process, a rear quarter panel is one of the first panels mounted to a vehicle frame, and subsequently mounted panels, doors, bumpers, fascia, etc., are mounted relative to the rear quarter panel, which underscores the need to properly align the outer body panel 12. In other words, if the outer body panel 12 is misaligned, many other structures may be misaligned.

Relative to the tail lamp 20, if the outer body panel 12 and tail lamp 20 are misaligned, the aesthetics of the vehicle 10 may suffer, as undesired gaps and spaces may be visible between the two components. Thus, in this disclosure, alignment of the tail lamp 20 relative to the outer body panel 12 is controlled by first aligning the components of a subassembly 24 (FIG. 2), which includes the outer body panel 12 and a tail lamp support 26 connected to the outer body panel 12. The tail lamp 20 is mountable to the tail lamp support 26.

With reference to FIGS. 2 and 3, the subassembly 24 is formed by aligning the tail lamp support 26 relative to the outer body panel 12 and connecting the tail lamp support 26 to the outer body panel 12. The subassembly 24 is formed by connecting the outer body panel 12 and the tail lamp support 26 before the subassembly 24 is connected to the body of the vehicle 10.

In this way, the tolerances between the two main components of the subassembly 24 are set before being mounted to the vehicle 10, which allows for increased precision by allowing one to set the tolerances in a more controlled setting rather than attempting to independently mount the two components to the body of the vehicle 10 and achieve the same result. Further, as will be appreciated from the below, the tail lamp support 26 is detachable from the outer body panel 12, and thus the tail lamp support 26, and in turn the tail lamp 20, remains mounted on a rigid part (i.e., the body/frame) of the vehicle 10 regardless of whether the outer body panel 12 is detached. In this way, the risk of a user unintentionally operating the vehicle 10 without the tail lamps is reduced.

With continued reference to FIGS. 2 and 3, the vehicle 10 includes a body 28, which includes the vehicle frame, and in particular includes the D-pillar 30, which is a substantially vertical support near the rear of the vehicle 10. In FIG. 2, the subassembly 24 is illustrated separate from the body 28. FIG. 2 is representative of the arrangement of the subassembly 24 before it is connected to the body 28.

Again, the subassembly 24 includes the outer body panel 12 and the tail lamp support 26. The outer body panel 12 and the tail lamp support 26 are separate structures, meaning they are formed independent of one another. The outer body panel 12 is made of one or more of metal, fiberglass, carbon fiber, fiber-reinforced plastic, as examples. Likewise, the tail lamp support 26 may be made of the same materials.

The tail lamp support 26 is detachable from the outer body panel 12. In particular, the tail lamp support 26 is not integrally formed with the outer body panel 12, nor is the tail lamp support 26 welded to the outer body panel 12. Despite not being welded to one another, the tail lamp support 26 is directly connected to the outer body panel 12, as shown in FIG. 2, at one or more subassembly attachment locations 32 by a first set of fasteners 34. The subassembly attachment locations 32 are exemplary only, and it should be understood that the fasteners 34 may be provided at other locations.

The fasteners 34 may be any type of hardware device configured to the mechanically join two objects together by way of a non-permanent joint. In other words, the fasteners 34 do not create permanent joints such as those created by welding. The fasteners 34 may include bolts, cams, ties, clasps, clamps, screws, latches, etc. While not limited to bolts, the fasteners 34 in FIGS. 2 and 3 are shown as bolts.

In a controlled setting, such as in an assembly environment, a worker or robot can align the outer body panel 12 and the tail lamp support 26 such that a desired arrangement between the tail lamp 20 and the other body panel 12 will be achieved. The desired alignment may be determined using gauges and/or calipers or other techniques. Once aligned, the fasteners 34 connect the outer body panel 12 to the tail lamp support 26 forming a rigid, yet non-permanent, joint. In particular, the fasteners 34 maintain a constant relative position between the outer body panel 12 and the tail lamp support 26 as the subassembly 24 is connected to the body 28. Thus, the subassembly 24 can be connected to the body 28 while maintaining a constant relative alignment between the tail lamp support 26 and the outer body panel 12.

FIG. 3 illustrates the subassembly 24 connected to the body 28. In this example, when connecting the subassembly to the body 28, a second set of fasteners 36 connect the outer body panel 12 to the body 28, and a third set of fasteners 38 connect the tail lamp support 26 to the body 28. The second and third sets of fasteners 38 may be provided by the same type of fasteners as the first set of fasteners 34. In FIG. 3, the second and third sets of fasteners 36, 38 are provided by bolts. To be clear, the first, second, and third sets of fasteners 34, 36, 38 may be provided by the same type of fastener or different fasteners, and it should be understood that the difference between the sets of fasteners, in this disclosure, is in the components that they connect. Further, the second and third sets of fasteners 36, 38 are shown in exemplary locations in FIG. 3. Further still, it should be understood that the body 28 and the tail lamp support 26 would include openings configured to receive the various fasteners 34, 36, 38. Those openings may be threaded, or the openings may be non-threaded and the fasteners 34, 36, 38 may be coupled to a corresponding bolt.

The second and third sets of fasteners 36, 38 form non-permanent joints between the body 28 and the outer body panel 12 and the tail lamp support 26, respectively, in this example. Further, the second set of fasteners 36 connect the outer body panel 12 directly to the side of the body 28, while the third set of fasteners 38 connect the tail lamp support 26 directly to the D-pillar 30.

Figure 4:
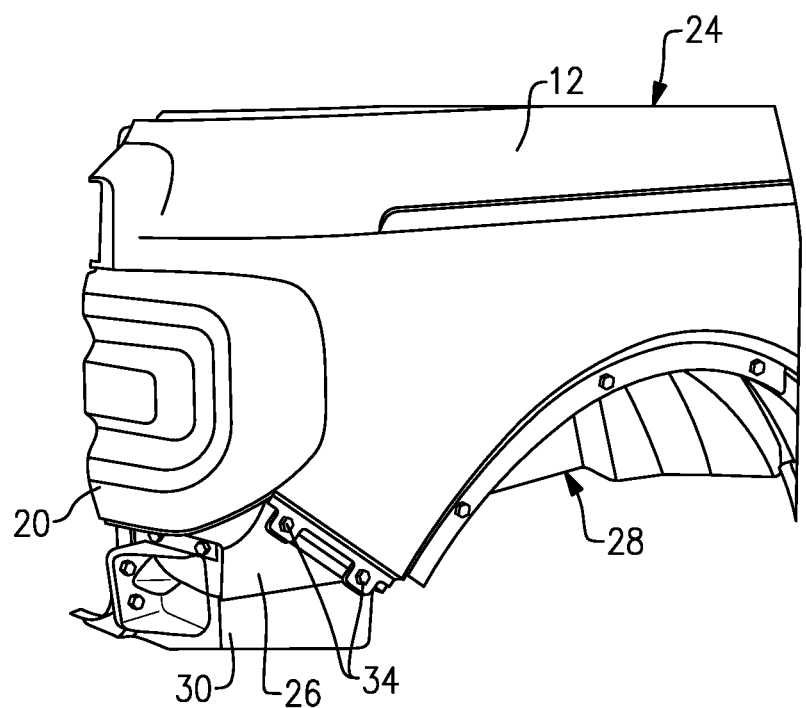
FIG. 4 is a view of the same section of the vehicle as in FIG. 3, and illustrates a tail lamp connected to the vehicle. In particular, the tail lamp is connected to the tail lamp support.
Figure 5:
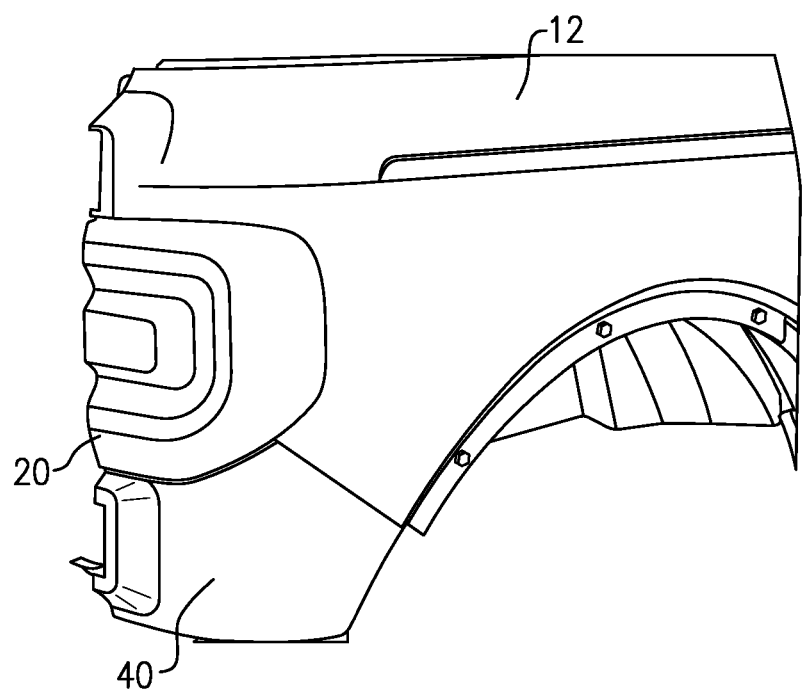
FIG. 5 is a view of the same section of the vehicle as in FIGS. 3 and 4, and illustrates a fascia connected to the vehicle adjacent the subassembly.

To complete installation, the tail lamp 20 is connected to the tail lamp support 26, as shown in FIG. 4, and the requisite electrical connections are also made. Optionally, another piece of fascia 40 is arranged adjacent the tail lamp 20, and in particular below the tail lamp 20, to provide the area adjacent the tail lamp 20 with a flush, finished look, as shown in FIG. 5. The fascia 40 may be part of a rear bumper, and may be made of a different material than the outer body panel 12, in some examples. The fascia 40 may be integrally formed with the outer body panel 12 in other examples.

With reference to FIGS. 3 and 4, when the subassembly 24 is connected to the body 28, the outer body panel 12 is arranged generally outward of the tail lamp support 26. Further, the tail lamp support 26 is detachable from the outer body panel 12 such that the outer body panel 12 may be removed from the body 28 independent of the tail lamp support 26. In particular, in order to remove the outer body panel 12, one detaches the first and second sets of fasteners 34, 36, and is not required to detach the third set of fasteners 38. In this way, the subassembly 24 would be disconnected by way of the detachment of the first set of fasteners 34, the outer body panel 12 would be free of both the tail lamp support 26 and the body 28 by detachment of the second set of fasteners 36, and the tail lamp support 26 would remain connected to the body 28 by the third set of fasteners 38.

Figure 6:
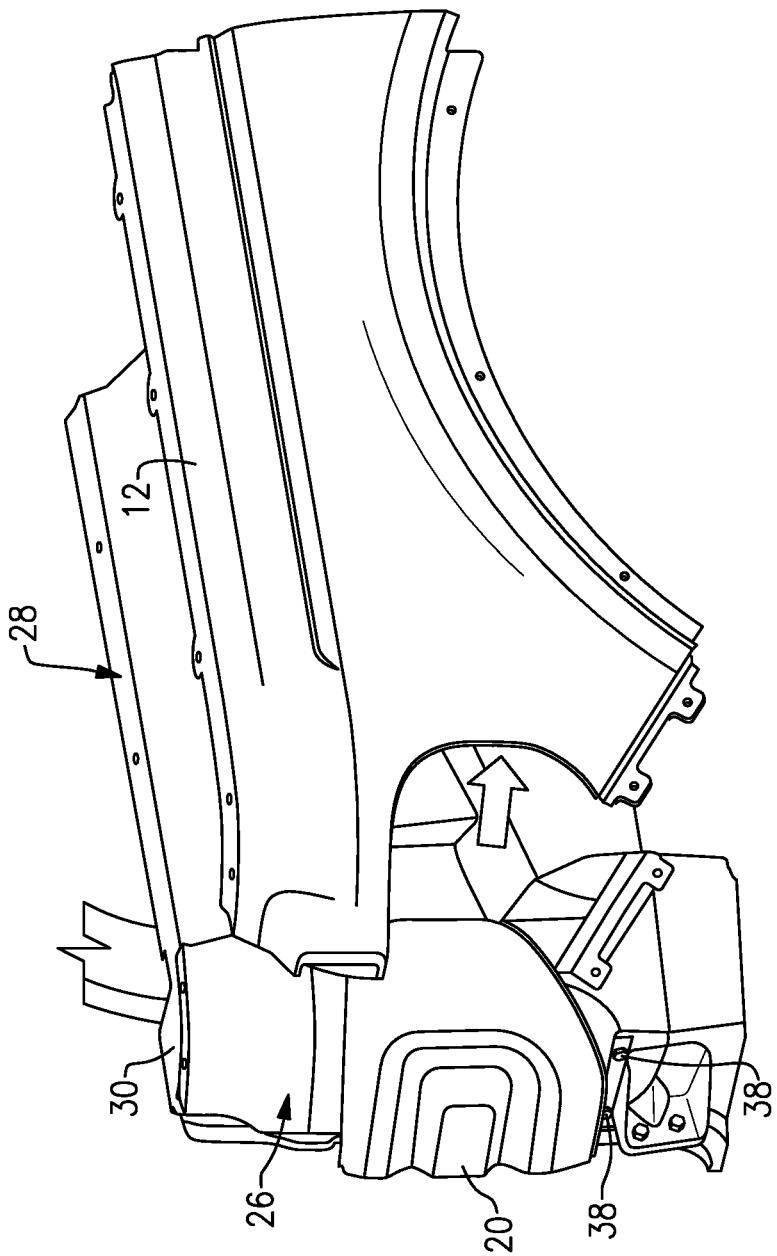
FIG. 6 is a view of the same section of the vehicle as in FIGS. 3-5, and illustrates the outer body panel being removed from the vehicle while the tail lamp support and tail lamp remain connected to the vehicle.

FIG. 6 shows such an arrangement. In FIG. 6, the first and second sets of fasteners 34, 36 have been detached while the third set of fasteners 38 remain attached. Thus, the outer body panel 12 is removed from the body 28 while the tail lamp support 26, and in turn the tail lamp 20, remains connected to the body 28.

It should be understood that terms such as "about," "substantially," and "generally" are not intended to be boundaryless terms, and should be interpreted consistent with the way one skilled in the art would interpret those terms. Further, directional terms such as "below," "forward," "rearward," "upward," "downward," "vertical," "horizontal," etc., are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various FIGS. accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A method, comprising:
    connecting a subassembly to a body of a motor vehicle, the subassembly including an outer body panel connected to a tail lamp support, wherein the step of connecting the subassembly to the body includes connecting the tail lamp support to the body such that the outer body panel may be removed from the body without requiring removal of the tail lamp support from the body.

2. The method as recited in claim 1, wherein a constant relative position between the outer body panel and the tail lamp support is maintained during the step of connecting the subassembly to the body.

3. The method as recited in claim 2, wherein the tail lamp support is aligned relative to the outer body panel before being connected to the outer body panel.

4. The method as recited in claim 1, further comprising:
    removing the outer body panel from the body while the tail lamp support remains connected to the body.

5. The method as recited in claim 1, wherein the tail lamp support is connected to a D-pillar of the motor vehicle.

6. The method as recited in claim 1, further comprising:
    mounting a tail lamp to the tail lamp support.

7. The method as recited in claim 6, further comprising:
    removing the outer body panel from the body while the tail lamp remains connected to the tail lamp support.

8. The method as recited in claim 1, wherein the outer body panel is a rear quarter panel.

9. A method, comprising:
    connecting a subassembly to a body of a motor vehicle, the subassembly including an outer body panel connected to a tail lamp support;
    wherein the subassembly includes a first set of fasteners connecting the outer body panel to the tail lamp support, and
    wherein the step of connecting the subassembly to the body includes connecting the outer body panel to the body with a second set of fasteners and connecting the tail lamp support to the body with a third set of fasteners.

10. The method as recited in claim 9, wherein the step of removing the outer body panel from the body includes detaching the first and second sets of fasteners but not the third set of fasteners.

11. A motor vehicle, comprising:
    a body; and
    a subassembly connected to the body, the subassembly including an outer body panel and a tail lamp support, wherein the tail lamp support is detachable from the outer body panel such that the outer body panel is removable from the body independent of the tail lamp support.

12. The motor vehicle as recited in claim 11, wherein: the subassembly includes a first set of fasteners connecting the outer body panel to the tail lamp support,
a second set of fasteners connect the outer body panel to the body, and
a third set of fasteners connect the tail lamp support to the body.

13. The motor vehicle as recited in claim 12, wherein the outer body panel is removable from the body by detaching the first and second sets of fasteners and without requiring the detachment of the third set of fasteners.

14. The motor vehicle as recited in claim 12, wherein first set of fasteners are configured to maintain a constant relative position between the outer body panel and the tail lamp support as the subassembly is connected to the body.

15. The motor vehicle as recited in claim 11, further comprising a tail lamp mounted to the tail lamp support.

16. The motor vehicle as recited in claim 15, wherein the tail lamp is mounted to the tail lamp support such that the outer body panel may be removed from the body without requiring removal of the tail lamp from the tail lamp support.

17. The motor vehicle as recited in claim 11, wherein the outer body panel is a rear quarter panel.

\* \* \* \* \*